United States Patent [19]

Sekine et al.

[11] Patent Number: 5,661,650
[45] Date of Patent: Aug. 26, 1997

[54] SYSTEM FOR CONTROLLING A VEHICLE RELATIVE TO A JUDGED SHAPE OF A TRAVEL ROAD

[75] Inventors: Hiroshi Sekine; Kazuya Tamura, both of Saitama, Japan

[73] Assignee: Honda Giken Kogyo Kabushiki Kaisha, Tokyo, Japan

[21] Appl. No.: 394,648

[22] Filed: Feb. 22, 1995

[30] Foreign Application Priority Data

Feb. 23, 1994 [JP] Japan ................................ 6-025294
Feb. 23, 1994 [JP] Japan ................................ 6-025295

[51] Int. Cl.$^6$ .......................... G06F 19/00; G01C 21/20
[52] U.S. Cl. .......................... 364/424.027; 364/424.051; 364/449.1; 340/995; 340/438
[58] Field of Search .................. 364/424.02, 424.05, 364/426.01, 426.04, 449, 424.027, 424.033, 424.051, 426.041, 449.1; 340/988, 995, 438, 441; 342/357, 457; 180/167, 168, 169

[56] References Cited

U.S. PATENT DOCUMENTS

| | | | |
|---|---|---|---|
| 5,046,011 | 9/1991 | Kakihara et al. | 364/449 |
| 5,146,219 | 9/1992 | Zechnall | 340/995 |
| 5,163,002 | 11/1992 | Kurami | 364/424.02 |
| 5,315,295 | 5/1994 | Fujii | 340/936 |
| 5,414,625 | 5/1995 | Hattori | 364/424.02 |
| 5,485,381 | 1/1996 | Heintz et al. | 364/426.04 |
| 5,539,397 | 7/1996 | Asanuma et al. | 340/901 |
| 5,546,311 | 8/1996 | Sekine | 364/449 |

FOREIGN PATENT DOCUMENTS

| | | |
|---|---|---|
| 0487280 | 5/1992 | European Pat. Off. |
| 543543 | 5/1993 | European Pat. Off. |
| 62-142216 | 6/1987 | Japan |
| 1-217210 | 8/1989 | Japan |
| 2-141899 | 5/1990 | Japan |
| 3-149700 | 6/1991 | Japan |
| 4-15799 | 1/1992 | Japan |
| 4-290200 | 10/1992 | Japan |

*Primary Examiner*—Michael Zanelli
*Attorney, Agent, or Firm*—Weiner, Carrier & Burt, P.C.; Joseph P. Carrier; Irving M. Weiner

[57] ABSTRACT

A vehicle position is determined and four reference coordinate points $N_1$, $N_2$, $N_3$ and $N_4$ are extracted at predetermined distances on a road output from a CD-ROM or an IC card, and an angle $\theta$ of turning of the vehicle from the coordinate point $N_2$ to the coordinate point $N_3$ is calculated according to an expression, $\theta=(\theta_1+\theta_2)$ from an angle $\theta_1$ formed by a vector $V_{12}$ between the points $N_1$, $N_2$ and a vector $V_{23}$ between the points $N_2$, $N_3$ and an angle $\theta_2$ formed by the vector $V_{23}$ between the points $N_2$, $N_3$ and a vector $V_{34}$ between the points $N_3$, $N_4$. A steering angle permitting the vehicle to safely pass through a curve is calculated based on the turning angle $\theta$ and a vehicle speed $V_0$, and a passable vehicle speed permitting the vehicle to safely pass through the curve is calculated based on a radius $R=a/\theta$ of curvature of the curve. Thus, the servicing of a conventional infrastructure requiring increased equipment and maintenance costs is not required, and it is possible to carry out a vehicle control based on a minimum amount of data storable in a CD-ROM or an IC card.

20 Claims, 19 Drawing Sheets

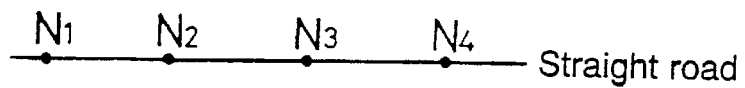
FIG10A — Straight road
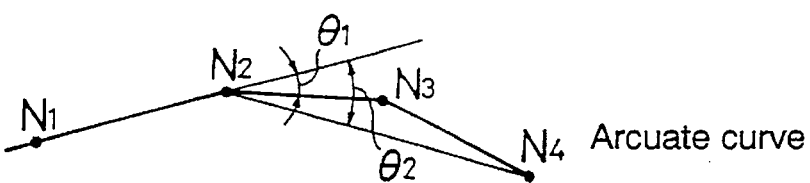
FIG10B — Arcuate curve
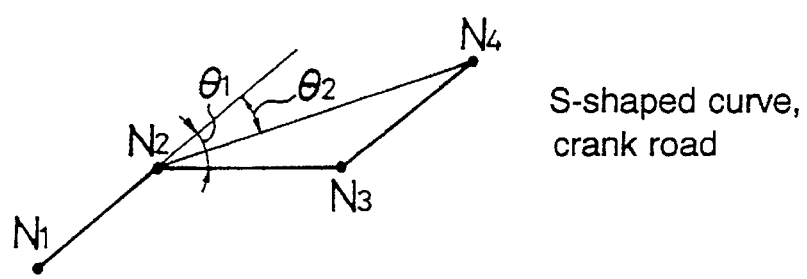
FIG10C — S-shaped curve, crank road
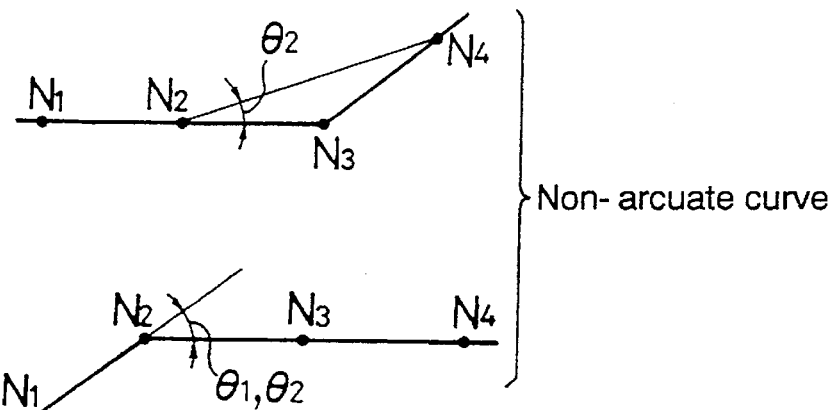
FIG10D
FIG10E
Non-arcuate curve

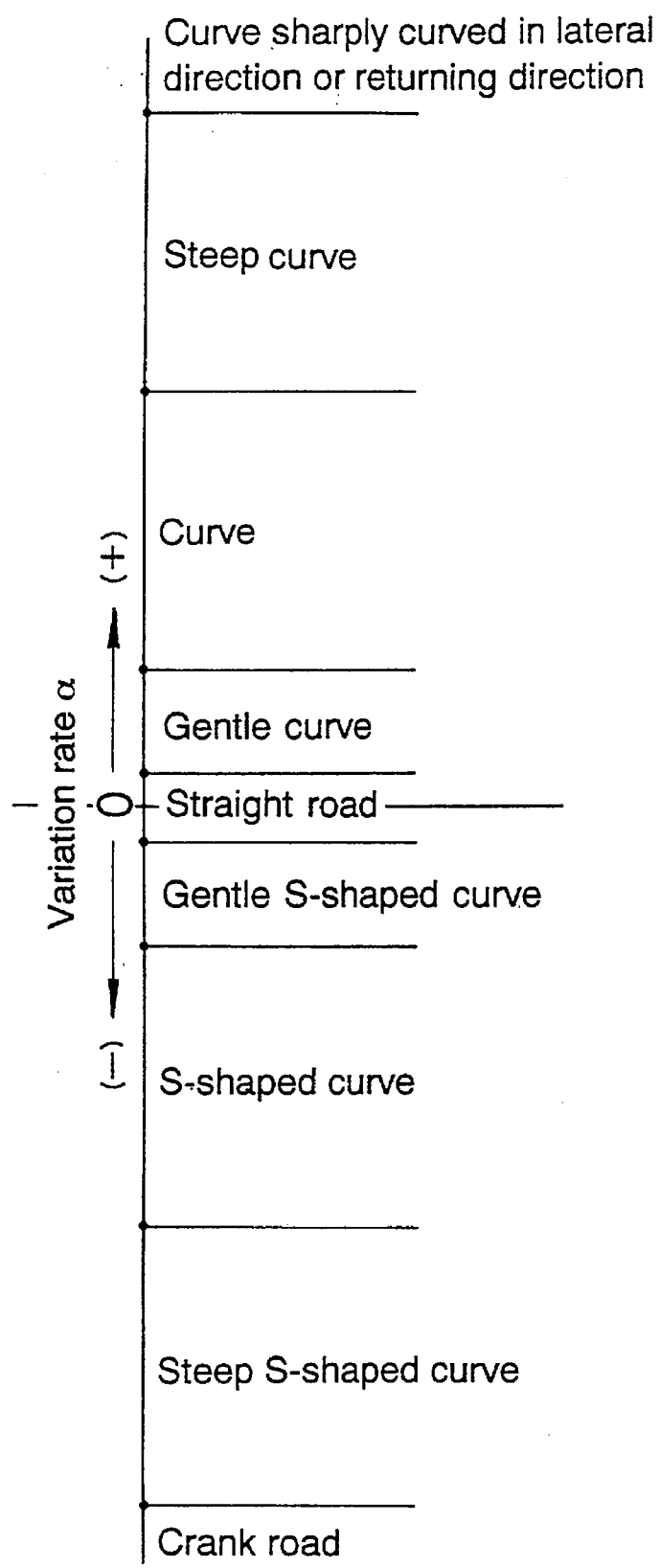

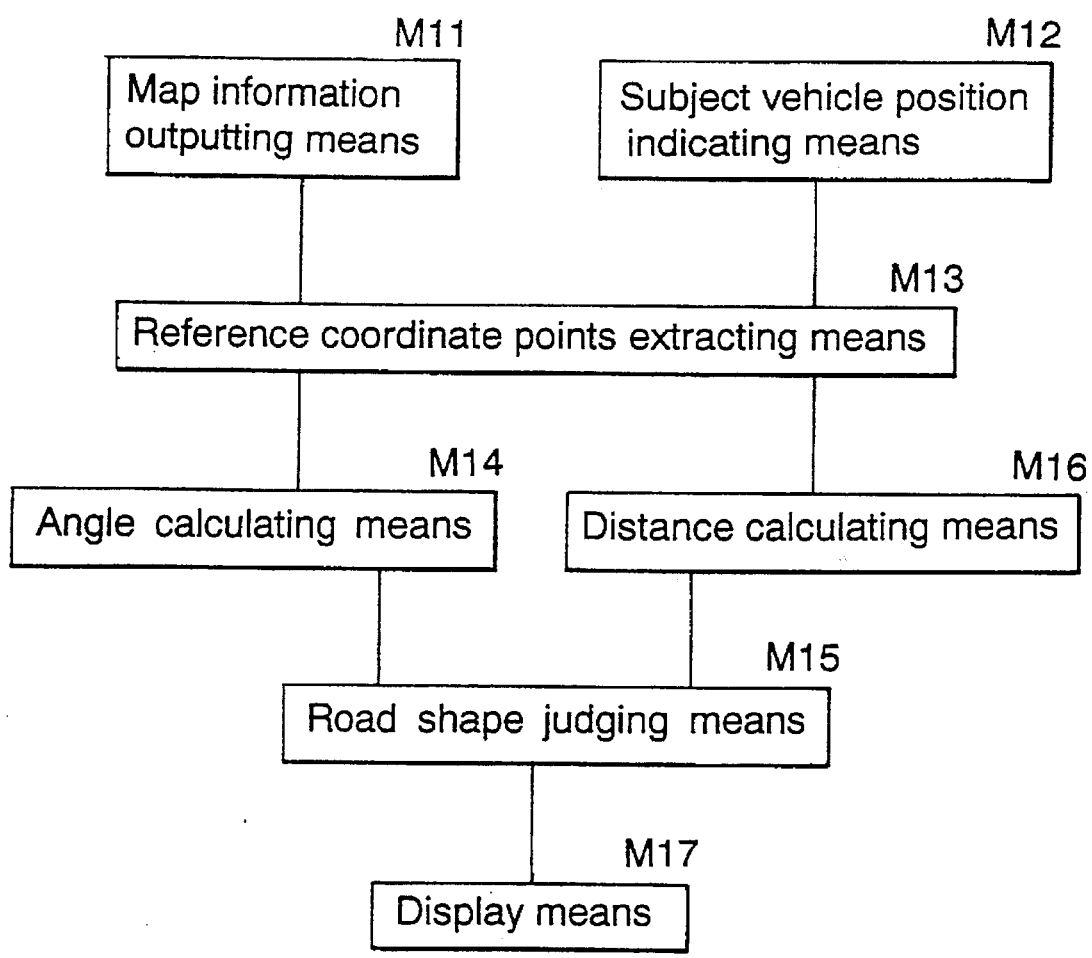

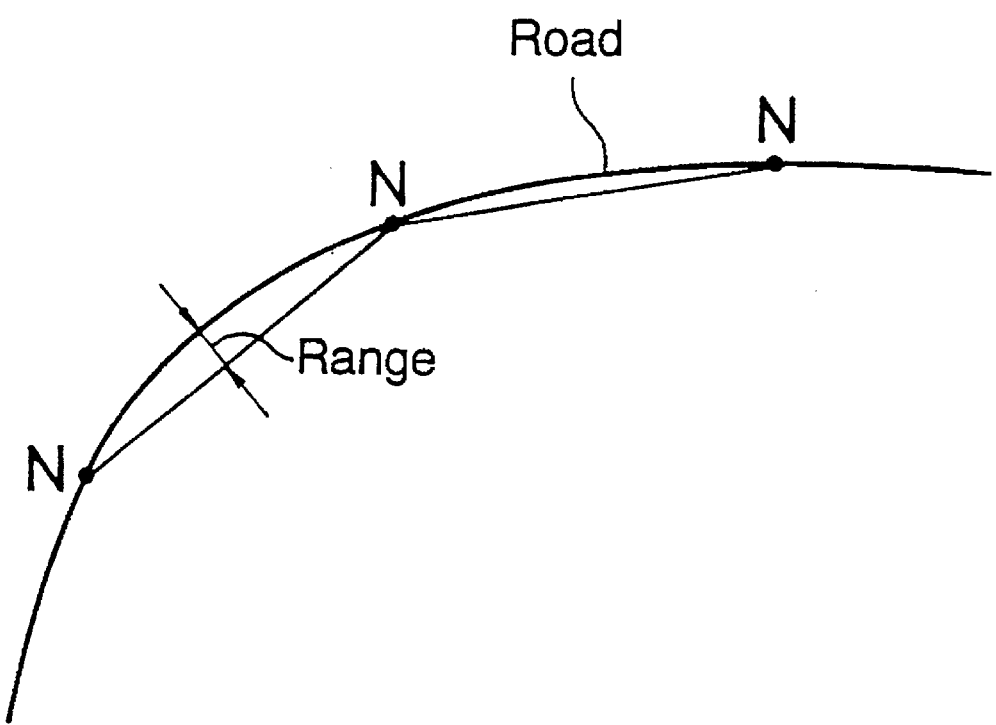

FIG16
(Patterns of arcuate curves)

| | When $L_{13}$ is small (steep curve) | When $L_{13}$ is large (gentle curve) | |
|---|---|---|---|
| $\theta \leq 30°$ | | | Arcuate curve having large radius of curvature (straight road) |
| $30° < \theta \leq 45°$ | | | Arcuate curve having medium radius of curvature (branch road) |
| $45° < \theta < 90°$ | | | Arcuate curve having small radius of curvature (intersection) |

(Patterns of non-arcuate curves)

| | $\theta \leqq 30°$ | $30° < \theta \leqq 45°$ | $45° < \theta < 90°$ |
|---|---|---|---|
| When $L_{12} > L_{23}$ (curve inlet) | | | |
| When $L_{23} > L_{12}$ (curve outlet) | | | |
| | Non-arcuate curve having large radius of curvature (straight road) | Non-arcuate curve having medium radius of curvature (branch road) | Non-arcuate curve having small radius of curvature (intersection) |

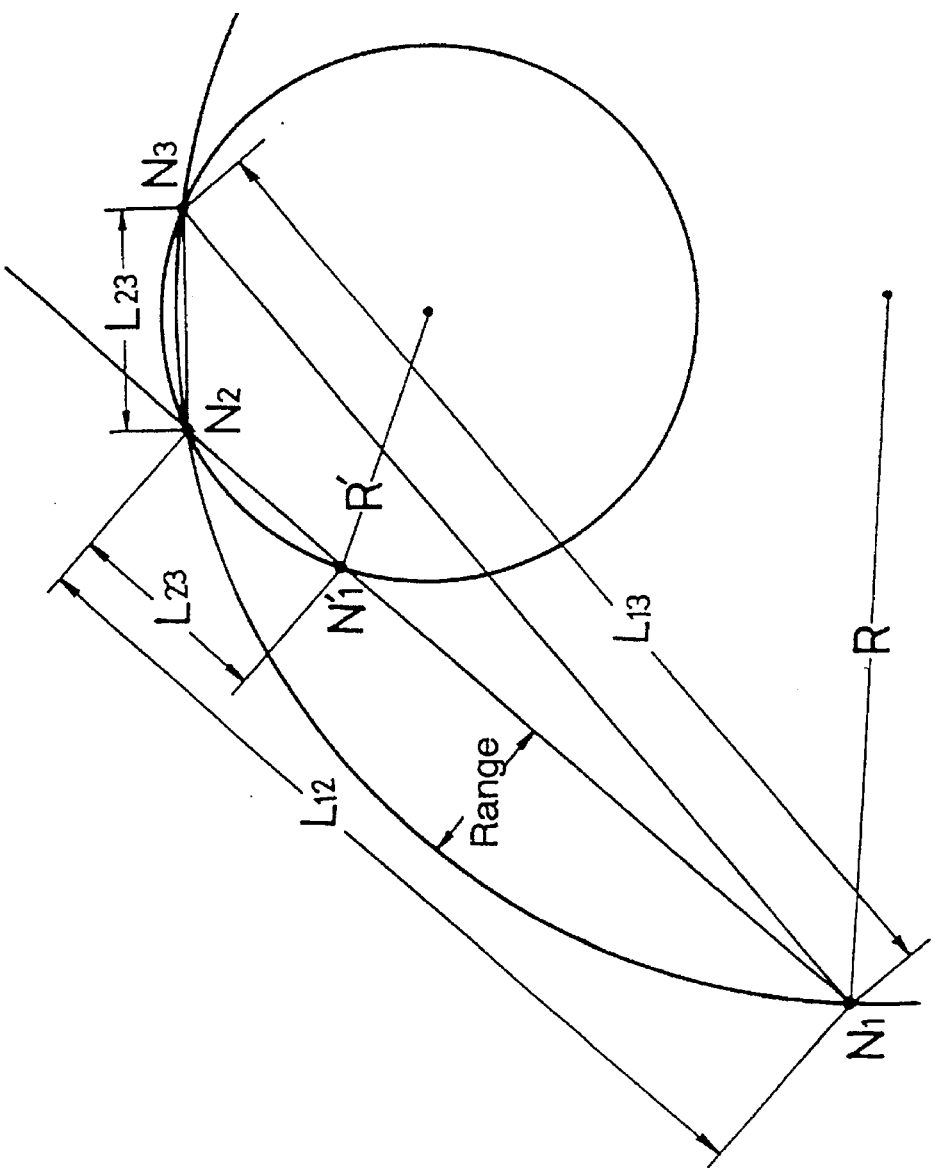

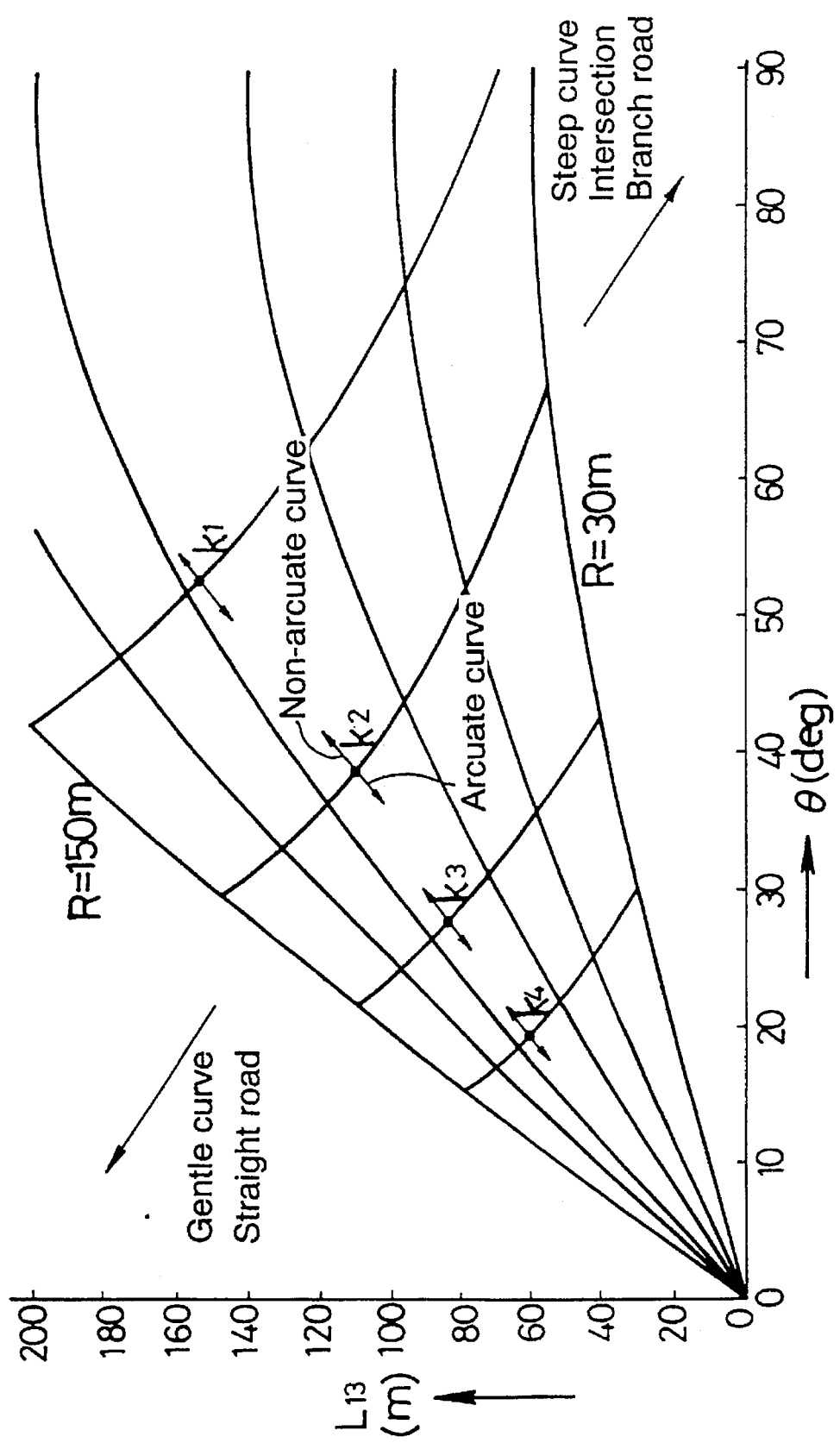

1

SYSTEM FOR CONTROLLING A VEHICLE RELATIVE TO A JUDGED SHAPE OF A TRAVEL ROAD

BACKGROUND OF THE INVENTION

1. Field of the Invention

The present invention relates to a vehicle control system for controlling a vehicle relative to the shape of a road on which it is traveling and in which the shape of the road is judged based on a map information comprised of a plurality of coordinate points constituting the road.

2. Description of Relevant Art

There is a known vehicle control system designed to transmit information such as an approach speed and a steering angle required for a vehicle to smoothly pass through a curve from a transmitter placed at a location short of an inlet of the curve so as to control a traveling state of a vehicle on the basis of such information (see Japanese Patent Application Laid-open No. 149700/91), and there is a known vehicle control system designed to control an auto-cruising device or the like of a vehicle on the basis of information such as the gradient of a road, the condition of a road surface and the radius of a curve which have been stored in a CD-ROM (see Japanese Patent Application Laid-open No. 15799/92).

The former system is disadvantageous in that it is difficult to place it on all roads, because costs for equipment and maintenance become too expensive, and the latter system is disadvantageous in that it is difficult to realize because it requires a very large amount of data. The present invention overcomes the disadvantages of the known systems.

SUMMARY OF THE INVENTION

Accordingly, it is an object of the present invention to judge the shape of a road ahead of a subject vehicle on the basis of map information comprised of a set of coordinate points constituting the road and to appropriately control the traveling state of a vehicle on the basis of the judged shape of the road.

To achieve the above object, according to the present invention, there is provided a vehicle control system comprising: a map information outputting means for outputting map information comprised of a plurality of coordinate points constituting a road; a subject vehicle position indicating means for indicating a position of a subject vehicle on the road; a reference coordinate point extracting means for extracting at least three reference coordinate points on a road ahead of the position of the subject vehicle; a road shape judging means for judging a shape of the road based on the extracted reference coordinate points; and a vehicle control means for controlling the vehicle based on the judged shape of the road.

In addition, according to the present invention, there is provided a vehicle control system comprising: a map information outputting means for outputting map information comprised of a plurality of coordinate points constituting a road; a subject vehicle position indicating means for indicating a position of a subject vehicle on the road; a reference coordinate point extracting means for extracting at least four reference coordinate points on a road ahead of the position of the subject vehicle; an angle calculating means for calculating angles formed by lines connecting the reference coordinate points; a road shape judging means for judging a shape of the road based on an arrangement of the reference coordinate points determined based on the calculated angles; and a vehicle control means for controlling the vehicle based on the judged shape of the road.

Further, according to the present invention, there is provided a vehicle control system comprising: a map information outputting means for outputting map information comprised of a plurality of coordinate points constituting a road; a subject vehicle position indicating means for indicating a position of a subject vehicle on the road; a reference coordinate point extracting means for extracting at least three adjacent reference coordinate points on a road ahead of the position of the subject vehicle; an angle calculating means for calculating angles formed by lines connecting the reference coordinate points; a distance calculating means for calculating distances between the reference coordinate points; a road shape judging means for judging a shape of the road based on an arrangement of the reference coordinate points determined from the calculated angles and the calculated distances; and a vehicle control means for controlling the vehicle based on the judged shape of the road.

With the above vehicle control systems according to the invention, servicing of an infrastructure requiring increased equipment and maintenance costs is not required and moreover, it is possible to judge the shape of the road with a minimum amount of data storable in a CD-ROM or IC card to control the vehicle.

The above and other objects, features and advantages of the invention will become apparent from the following description of preferred embodiments taken in conjunction with the accompanying drawings.

BRIEF DESCRIPTION OF THE DRAWINGS

FIGS. 1 to 4 illustrate a first embodiment of the present invention, wherein

FIG. 1 is a block diagram illustrating the entire arrangement of a vehicle control system according to the present invention;

FIG. 2 is a block diagram of a control system;

FIG. 3 is a diagram for explaining a way for determining a steering angle;

FIG. 4 is a diagram for explaining a way for determining a passable vehicle speed;

FIGS. 6 to 11 illustrate a third embodiment of the present invention, wherein

FIG. 6 is a block diagram of a control system;

FIG. 7 is a flow chart illustrating the operation;

FIG. 8 is a diagram for explaining a way for determining the shape of a road;

FIGS. 10A–10E are diagrams illustrating road shape patterns;

FIG. 11 is a diagram illustrating a criterion for judging the shape of a road;

FIG. 12 is a block diagram of a control system; FIGS. 12 to 19 illustrate a fourth embodiment of the present invention, wherein FIG. 13 is a diagram for explaining a range;

FIG. 14 is a diagram for explaining a way for determining the shape of a road;

FIG. 15 is a diagram for explaining a way for determining a radius of curvature of an arcuate curve;

FIG. 16 is a diagram illustrating road shape patterns;

FIG. 17 is a diagram illustrating road shape patterns;

FIG. 18 is a diagram for explaining a way for judging a nonarcuate curve; and

FIG. 19 is a diagram illustrating a criterion for judging the shape of a road.

DESCRIPTION OF THE PREFERRED EMBODIMENTS

A first embodiment of the present invention will now be described with reference to FIGS. 1 to 4.

Figure 1:
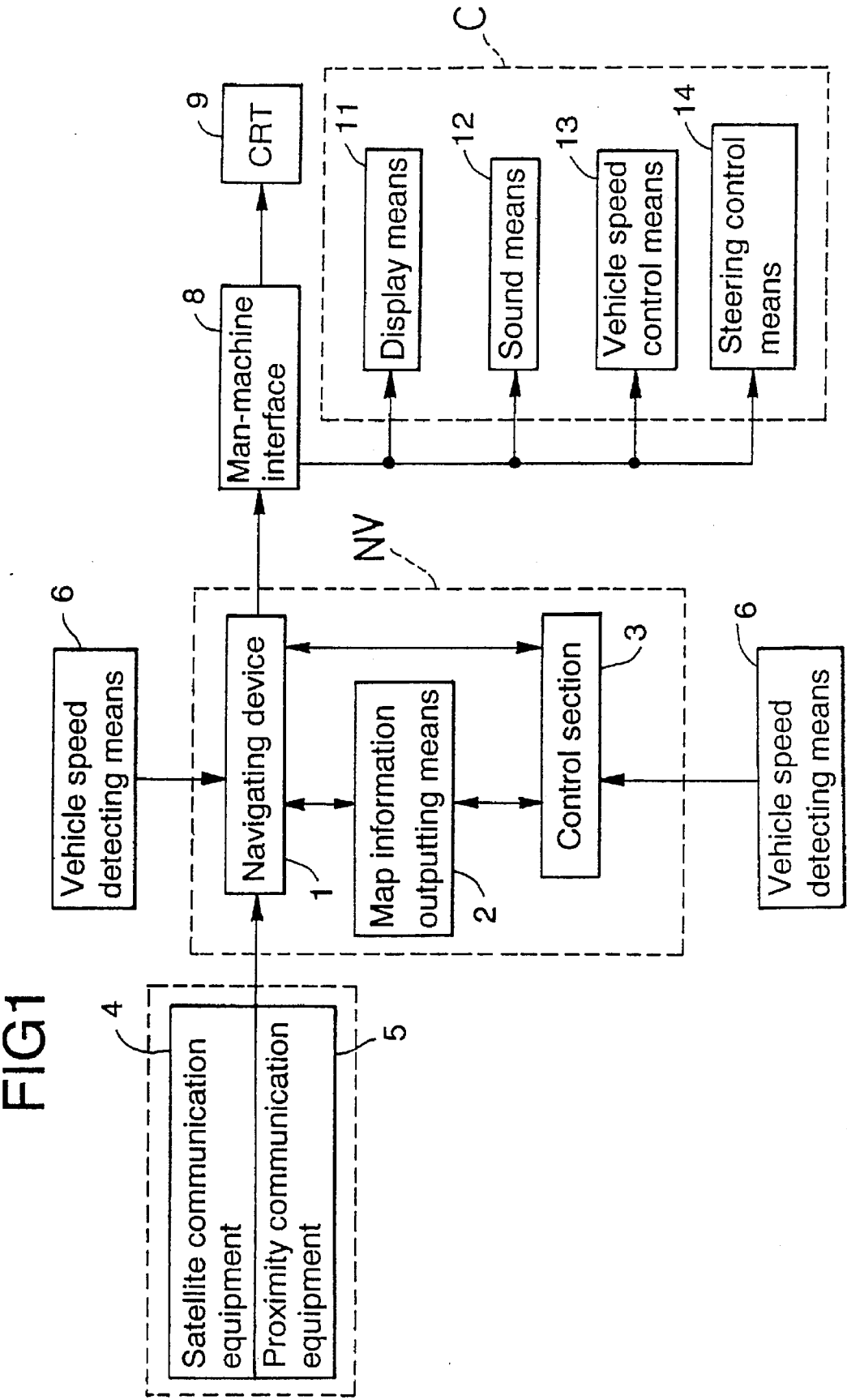

In FIG. 1, NV is a navigation system for a vehicle, which includes a well-known navigating device 1, a map information outputting means 2 using an IC card or CD-ROM, and a control section 3 for performing various calculations which will be described hereinafter.

The navigating device 1 receives a signal from a vehicle speed detecting means 6 in addition to subject vehicle position information, road information, traffic information and the like from satellite communication equipment 4 or proximity communication equipment 5, and calculates a current position of a subject vehicle and a course to a destination on the basis of such signal and map information from the map information outputting means 2 to display them on a CRT 9 through a man-machine interface 8.

The map information output from the map information outputting means 2 is comprised of an aggregation of phantom nodes N disposed on a road. Each of the nodes N is defined by coordinates N (X, Y). When there is a turn, a junction or an intersection on a road, they are preferentially selected as node points N.

The control section 3 performs various calculations (which will be described hereinafter) on the basis of outputs from the navigation device 1, the map outputting means 2 and the vehicle speed detecting means 6 to display results and provide an alarm, a control of steering angle and a control of vehicle speed.

C is a vehicle control device which includes, therein, a display means 11, a sound means 12, a vehicle speed control means 13 and a steering control means 14. The display means 11 may be, for example, a head-up display, and gives an alarm to a driver by displaying a radius of curvature of a curve ahead of the subject vehicle, a vehicle speed permitting the subject vehicle to safely pass through the curve or the like. The sound means 12 may be a buzzer, chime or the like and gives various alarms to the driver along with the display means 11. The vehicle speed control means 13 may be a brake device, an auto-cruising device, a shift control device, a throttle control device or the like, and automatically adjusts the vehicle speed, so that the subject vehicle can safely pass through a curve. The steering control means 14 may be a steering device for controlling the steering angle or the steering torque, and automatically adjusts the steering, so that the subject vehicle can safely pass through a curve.

Figure 2:
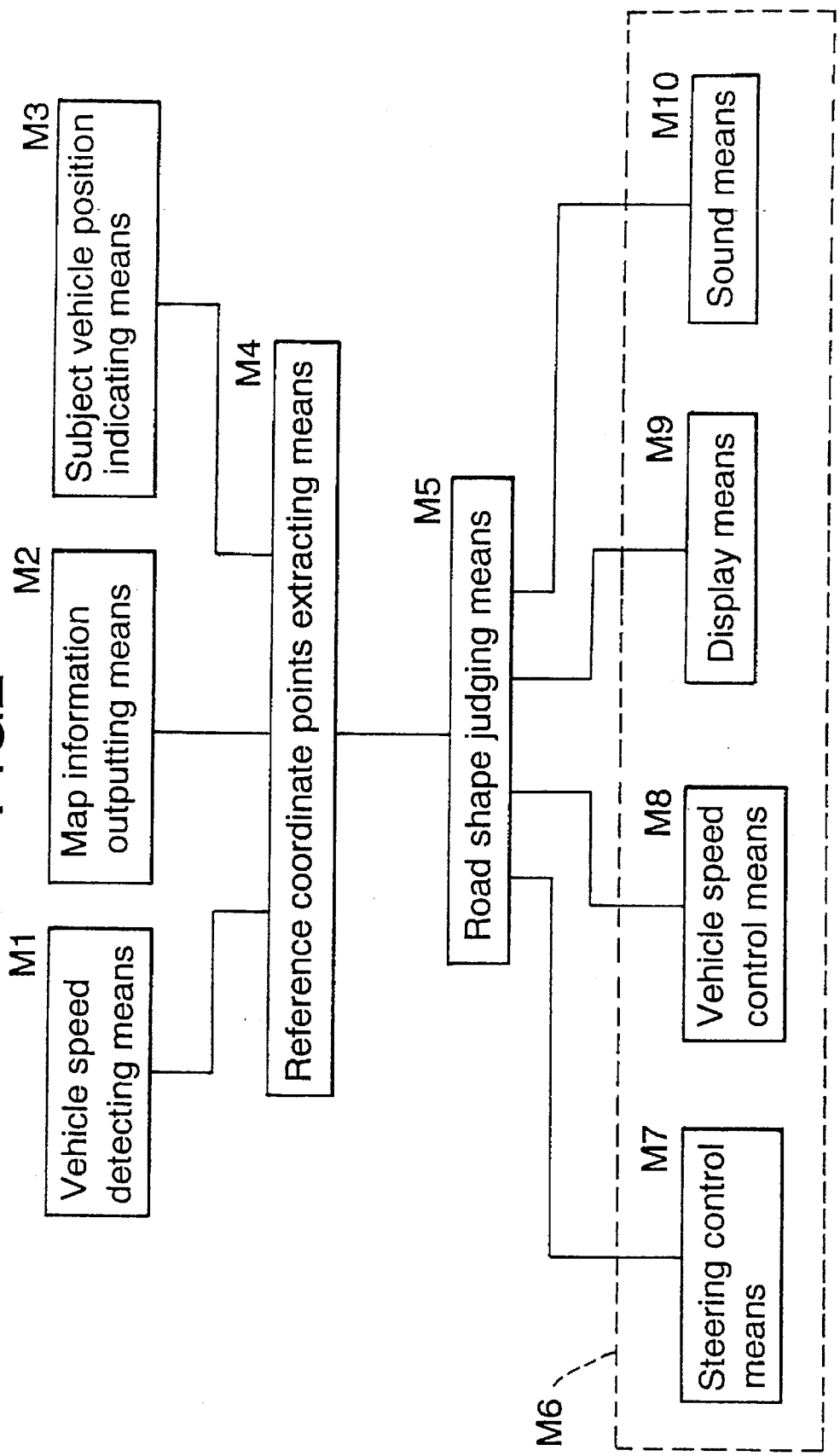

FIG. 2 is a block diagram illustrating a control system according to the present invention. The control system includes a vehicle speed detecting means M1 corresponding to the vehicle speed detecting means 6, a map information outputting means M2 corresponding to the map information outputting means 2, a subject vehicle position indicating means M3 corresponding to the navigating device 1, a reference coordinate points extracting means M4 and a road shape judging means M5 which correspond to the control section 3, and a vehicle control means M6 corresponding to the vehicle control device C. The vehicle control means M6 includes a steering control means M7 corresponding to the steering control means 14, a vehicle speed control means M8 corresponding to the vehicle speed control means 13, a display means M9 corresponding to the display means 11, and a sound means M10 corresponding to the sound means 12.

The reference coordinate point extracting means M4 extracts four node points $N_1$, $N_2$, $N_3$ and $N_4$ (which will be referred to as reference nodes hereinafter) for judging the shape of a road from a large number of nodes N established on a road.

The road shape judging means M5 judges the shape of a road on the basis of an arrangement of the four reference nodes $N_1$, $N_2$, $N_3$ and $N_4$.

The arrangement shown in FIG. 1 is also directly applied to second, third and fourth embodiments which will be described hereinafter, and the arrangement shown in FIG. 2 is also directly applied to the second embodiment.

The operation in judging the shape of a road to provide a control of steering will be described below.

First, a vehicle speed $V_0$ is read from the vehicle speed detecting means M1, and map information (i.e., coordinates (X, Y) of the nodes N) is read from the map information outputting means M2. Further, a position of the subject vehicle is read from the subject vehicle position indicating means M3.

Figure 3:
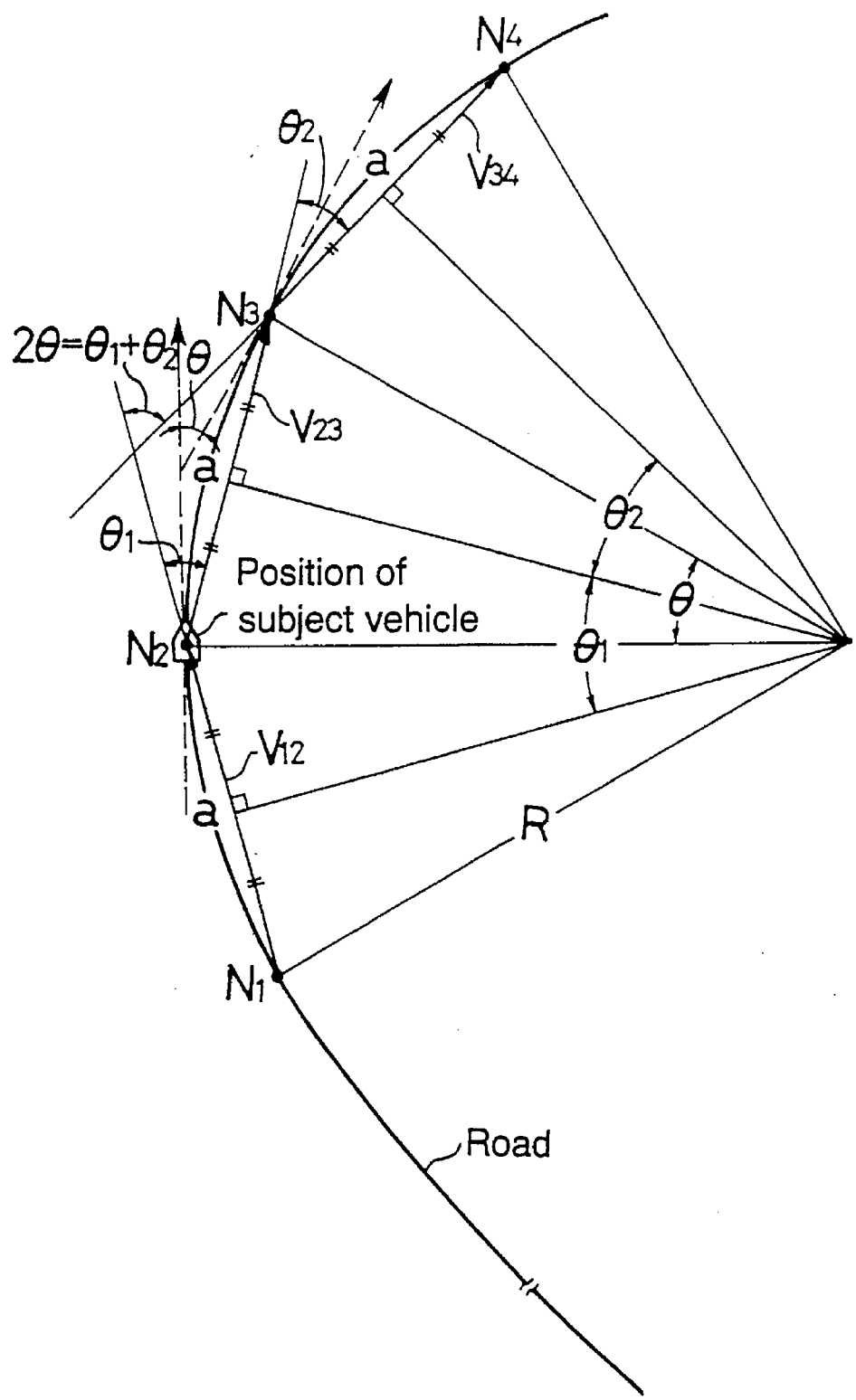

Then, the four reference nodes $N_1$ to $N_4$ for judging the shape of road are extracted by the reference coordinate points extracting means M4. As shown in FIG. 3, the second reference node $N_2$ is set at the position of the subject vehicle; the first reference node $N_1$ is set at a position behind the second reference node $N_2$ by a distance a; the third reference node $N_3$ is set at a position ahead of the second reference node $N_2$ by the distance a; the fourth reference node $N_4$ is set at a position ahead of the ad reference node $N_3$ by the distance a. The distance a is determined as a product of the vehicle speed $V_0$ and a predetermined time $t_1$ ($a=V_0 \times t_1$).

In this way, the distance a between the adjacent reference nodes $N_1$ to $N_4$ can be determined in accordance with the vehicle speed $V_0$ and thus, when the vehicle speed $V_0$ is large, the distance between the adjacent reference nodes $N_1$ to $N_4$ can be determined at a large value, and a sufficient calculating time for judging the shape of road can be insured.

If there is no node N existing at a position which is established by a multiple of the distance a on the basis of a virtual position of the subject vehicle, i.e., there is not a road datum at the position, the nodes N in closest proximity to such position are extracted as reference nodes $N_1$ to $N_4$. In addition, if data of the nodes N are coarse and there is no node N existing within a range of the distance a, consecutive four nodes N are selected as reference nodes $N_1$ to $N_4$.

Provided that the shape of a road is curved and four reference nodes $N_1$ to $N_4$ exist substantially on a circular are, an angle θ of turning of the subject vehicle from the second reference node $N_2$ which is a position of the subject vehicle to the next third node $N_3$ is determined by the road shape judging means M5 in the following manner, with reference to FIG. 3.

First, the following vectors are calculated: a vector $V_{12}$ ($X_{12}$, $Y_{12}$) connecting the first reference node $N_1$ ($X_1$, $Y_1$) and the second reference node $N_2$ ($X_2$, $Y_2$), a vector $V_{23}$ ($X_{23}$, $Y_{23}$) connecting the second reference node $N_2$ ($X_2$, $Y_2$) and the third reference node $N_3$ ($X_3$, $Y_3$), and a vector $V_{34}$ ($X_{34}$, $Y_{34}$) connecting the third reference node $N_3$ ($X_3$, $Y_3$) and the fourth reference node $N_4$ ($X_4$, $Y_4$).

At this time, if an angle formed by the vector $V_{12}$ and the vector $V_{23}$ is represented by $\theta_1$, a following expression (1) is established from an inner product of the vector $V_{12}$ and the vector $V_{23}$, and the angle $\theta_1$ is determined from such expression (1):

$$X_{12} \times X_{23} + Y_{12} \times Y_{23} = (X_{12}^2 + Y_{12}^2)^{1/2} \times (X_{23}^2 + Y_{23}^2)^{1/2} \times \cos\theta_1 \quad (1)$$

In addition, if an angle formed by the vector $V_{23}$ and the vector $V_{34}$ is represented by $\theta_2$, a following expression (2) is established from an inner product of the vector $V_{23}$ and the vector $V_{34}$, and the angle $\theta_2$ is determined from such expression (2):

$$X_{23} \times X_{34} + Y_{23} \times Y_{34} = (X_{23}^2 + Y_{23}^2)^{1/2} \times (X_{34}^2 + Y_{34}^2)^{1/2} \times \cos\theta_2 \quad (2)$$

Thus, an angle $\theta$ of turning of the subject vehicle from the second reference node $N_2$ to the third reference node $N_3$ is determined according to a following expression (3):

$$\theta = (\theta_1 + \theta_2)/2 \quad (3)$$

And a radius R of curvature of a circular arc is determined according to a following expression (4):

$$R = 2a/(\theta_1 + \theta_2) \quad (4)$$

A steering angle $\theta_{STRG}$ in turning of the subject vehicle from the second reference node $N_2$ to the third reference node $N_3$ can be obtained according to a following expression (5):

$$\begin{aligned}\theta_{STRG} &= (1 + A \times V_0^2) \times b \times N/R \\ &= (\theta_1 + \theta_2) \times (1 + A \times V_0^2) \times b \times N/2a\end{aligned} \quad (5)$$

wherein
A is a stability factor;
b is a wheel base; and
N is a steering gear ratio.

If the presence of a curve in the road ahead of the subject vehicle is judged in the above manner, a driver is informed of the radius R of curvature of the curve and the steering angle $\theta_{STRG}$ by the display means M9 and the sound means M10, and an automatic steering control is conducted by the steering control means M7, so that the subject vehicle can reliably pass through the curve.

In this way, the shape of the road is judged on the basis of the map information comprising the plurality of coordinates N (X, Y) of the plurality of nodes N, and the steering angle is controlled on the basis of the judged shape of the road. Therefore, the servicing of an infrastructure requiring increased equipment and maintenance costs is needless, and a control of traveling of the vehicle can be carried out with a minimum mount of data storable in the CD-ROM or the IC card with the present invention.

Figure 4:
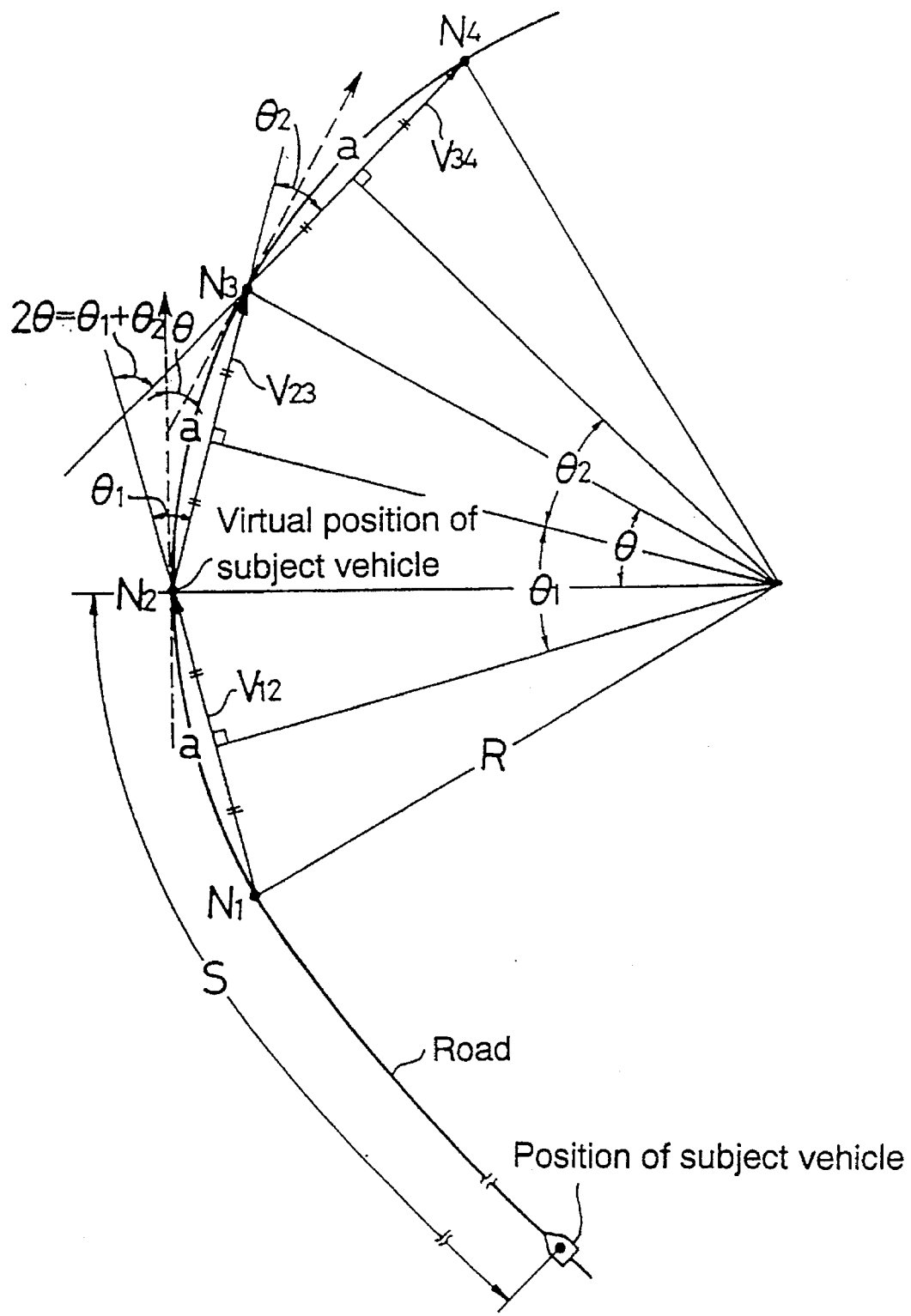

The operation in judging the shape of a road to perform a control of vehicle speed will be described below with reference to FIG. 4.

In performing the control of vehicle speed, the manner in which the four reference nodes $N_1$, $N_2$, $N_3$ and $N_4$ are extracted is different from that in performing the control of steering angle. More specifically, as shown in FIG. 4, a virtual position of the subject vehicle is set at a position ahead of the position of the subject vehicle by a preread distance S, and the second reference node $N_2$ is set at this virtual position of the subject vehicle. The first reference node $N_1$ is set at a position behind the second reference node $N_2$ by a distance a; the third reference node $N_3$ is set at a position ahead of the second reference node $N_2$ by the distance a; and the fourth reference node $N_4$ is set at a position ahead of the third reference node $N_3$ by the distance a. The preread distance S is provided as a distance permitting the vehicle to be stopped within a predetermined time $t_2$ upon speed-reduction at a predetermined deceleration $\beta$ from the vehicle speed $V_0$, by the following expression (6):

$$S = V_0 \times t_2 - (\beta \times t_2^2/2) \quad (6)$$

If it is required to effect the speed-reduction in accordance with the judged shape of road, a time margin therefor can be provided by setting the preread distance S.

Now, a passable vehicle speed $V_S$ permitting the subject vehicle to pass between the second and third reference nodes $N_2$ and $N_3$ at a reference lateral acceleration $\alpha$ or less is given by a following expression (7):

$$V_S = (R \times \alpha)^{1/2} \quad (7)$$

wherein R is a radius of curvature of a road. The above-described expression (4) is applied to this expression (7) to provide a following expression (8):

$$V_S = \{2a \times \alpha/(\theta_1 + \theta_2)\}^{1/2} \quad (8)$$

More specifically, if the vehicle speed $V_0$ is equal to or lower than the passable speed $V_S$, it is possible for the vehicle to safely pass through the curve between the second and third reference nodes $N_2$ and $N_3$ without speed-reduction. If the vehicle speed $V_0$ is higher than the passable speed $V_S$, it is impossible for the vehicle to safely pass through the curve between the second and third reference nodes $N_2$ and $N_3$, unless the speed is reduced down to the passable speed $V_S$.

If it is determined that there is a curve in a road ahead of the subject vehicle, the driver is informed of the radius R of curvature of the curve and the passable vehicle speed $V_S$ by the display means M9 and the sound means M10, and when the vehicle speed $V_0$ is higher than the passable vehicle speed $V_S$, an automatic reduction in speed is carried out by the vehicle speed control means M8, so that the subject vehicle can reliably and safely pass through the curve.

As described above, the shape of the road is judged on the basis of the map information comprising the plurality of coordinates N (X, Y) of the plurality of nodes N, and the vehicle speed is controlled on the basis of the judged shape of the road. Therefore, the servicing of an infrastructure requiring increased equipment and maintenance costs is not required, and a control of traveling of the vehicle can be carried out with a minimum mount of data storable in the CD-ROM or the IC card according to the present invention.

In carrying out the above-described automatic steering and automatic speed reduction, it is required that the subject vehicle be traveling on a set course, and if the subject vehicle has deviated from the set course by a driver's intention or due to a mistake, it is desirable to turn the system OFF. It can be judged in the following manner whether or not there is a possibility that the subject vehicle may deviate from the set Referring to FIG. 3, when the vehicle has turned while traveling on a rightful course from the second reference node $N_2$ to the third reference node $N_3$, a target angle $\theta$ of turning of the vehicle is given by an expression, $\theta = (\theta_1 + \theta_2)/2$ (see the expression (3) above). An actual angle $\gamma$ of turning of the vehicle is determined by integrating an actual yaw rate $d\gamma/dt$ detected by a yaw rate sensor mounted on the vehicle over a time period $t_1$ ($t_1=a/V_0$) from a time point when the vehicle passes through the second reference node $N_2$ to a time point when the vehicle reaches the third reference node $N_3$. Then, a deviation $|\theta-\gamma|$ between the target turning angle $\theta$ and the actual turning angle $\gamma$ is calculated. If the deviation $|\theta-\gamma|$ is equal to or lower than a predetermined value, it is determined that there is no possibility that the vehicle may deviate from the set course. If the deviation $|\theta-\gamma|$ exceeds the predetermined value, it is determined that there is a possibility that the vehicle may deviate from the set course, and an alarm can be given to the driver.

A limit of the deviation $|\theta-\gamma|$ can be set as a value in which the vehicle does not go off of a road having a width W, according to a following expression (9), for example, while the vehicle is traveling through the distance a from the second reference node $N_2$ to the third reference node $N_3$:

$$a\times|\theta-\gamma| \leq W/2 \qquad (9)$$

A second embodiment of the invention will now be described with reference to FIG. 5, which is similar to FIG. 3 in the first embodiment. In the above-described first embodiment, the shape of the road is judged on the basis of the four reference nodes $N_1$ to $N_4$ to perform the control of the vehicle, but in the second embodiment, three reference nodes $N_1$, $N_2$ and $N_3$ are employed in place of the four reference nodes $N_1$ to $N_4$ in the first embodiment.

Figure 5:
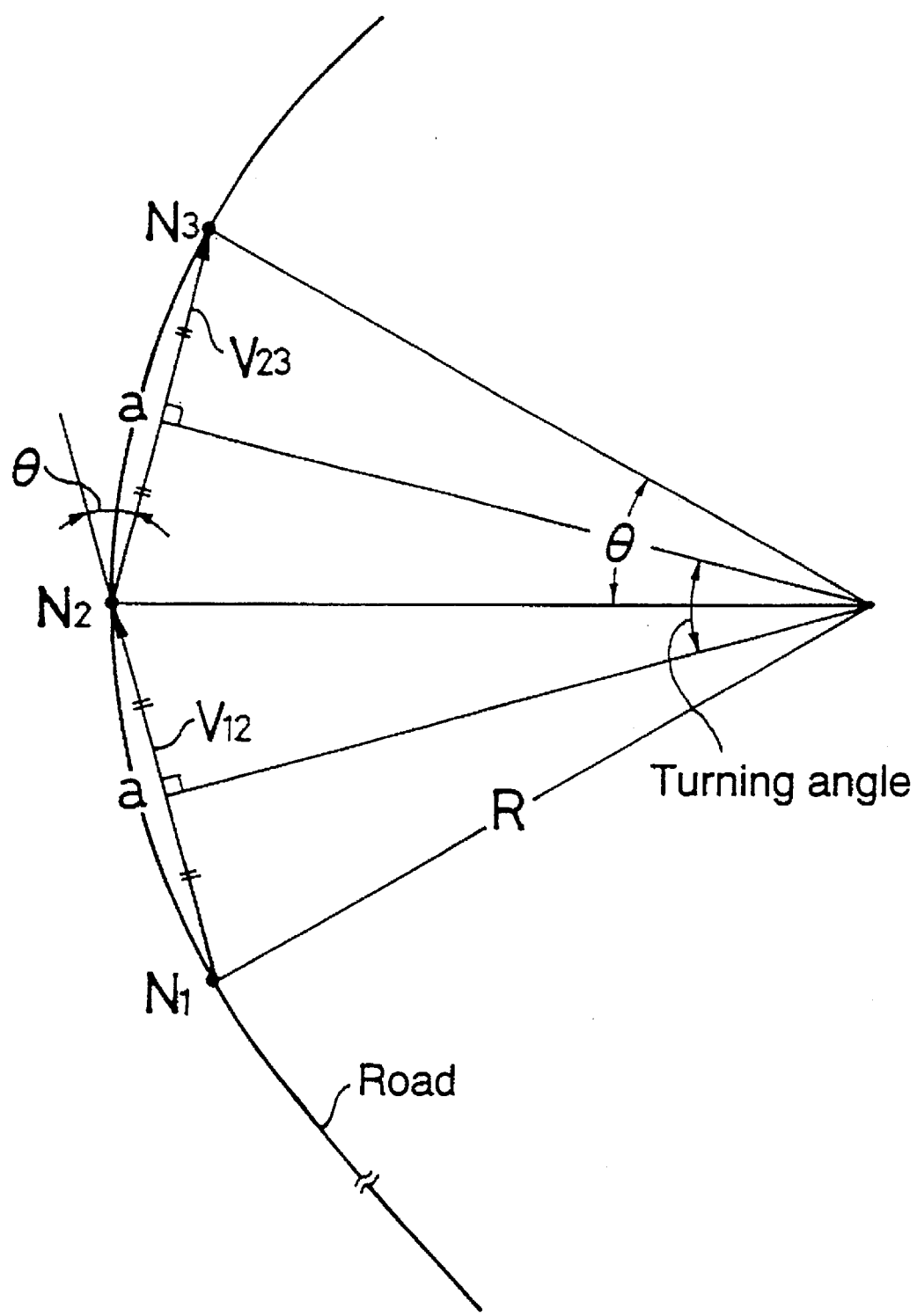
FIG. 5 is a diagram similar to FIG. 3, but illustrating a second embodiment in which three reference nodes are used.

As shown in FIG. 5, an angle $\theta$ formed by the vector $V_{12}$ ($X_{12}$, $Y_{12}$) and the vector $V_{23}$ ($X_{23}$, $Y_{23}$) is determined according to a following expression (10):

$$X_{12}\times X_{23}+Y_{12}\times Y_{23}=(X_{12}^2+Y_{12}^2)^{1/2}\times(X_{23}^2+Y_{23}^2)^{1/2}\times\cos\theta \qquad (10)$$

The angle $\theta$ determined in this manner is an approximate value substituted for an angle of turning from a midpoint between the first and second reference nodes $N_1$ and $N_2$ to a midpoint between the second and third reference nodes $N_2$ and $N_3$. Therefore, when the three reference nodes $N_1$, $N_2$ and $N_3$ are used, a radius $R=a/\theta$ of curvature can be used in place of the above-described expression (4); a steering angle $\theta_{STRG}=\theta\times(1+A\times V_0^2)\times b\times N/a$ can be used in place of the above-described expression (5), and a passable vehicle speed $V_S=(a\times\alpha/\theta)^{1/2}$ can be used in place of the above-described expression (8).

In the above-described first and second embodiments, the following modifications in design may be made.

Even in performing the control of steering, a preread distance S can be established. This preread distance S is determined from a vehicle speed $V_0$ and a predetermined time $t_2$ according to an expression, $S=V_0\times t_2$. It is possible for the vehicle to smoothly pass through a curve by performing the steering to a target steering angle, while the vehicle is traveling through the preread distance S. In performing the control of steering, the steering torque may be controlled in place of the steering angle.

A third embodiment of the present invention will now be described with reference to FIGS. 6 to 11.

Figure 6:
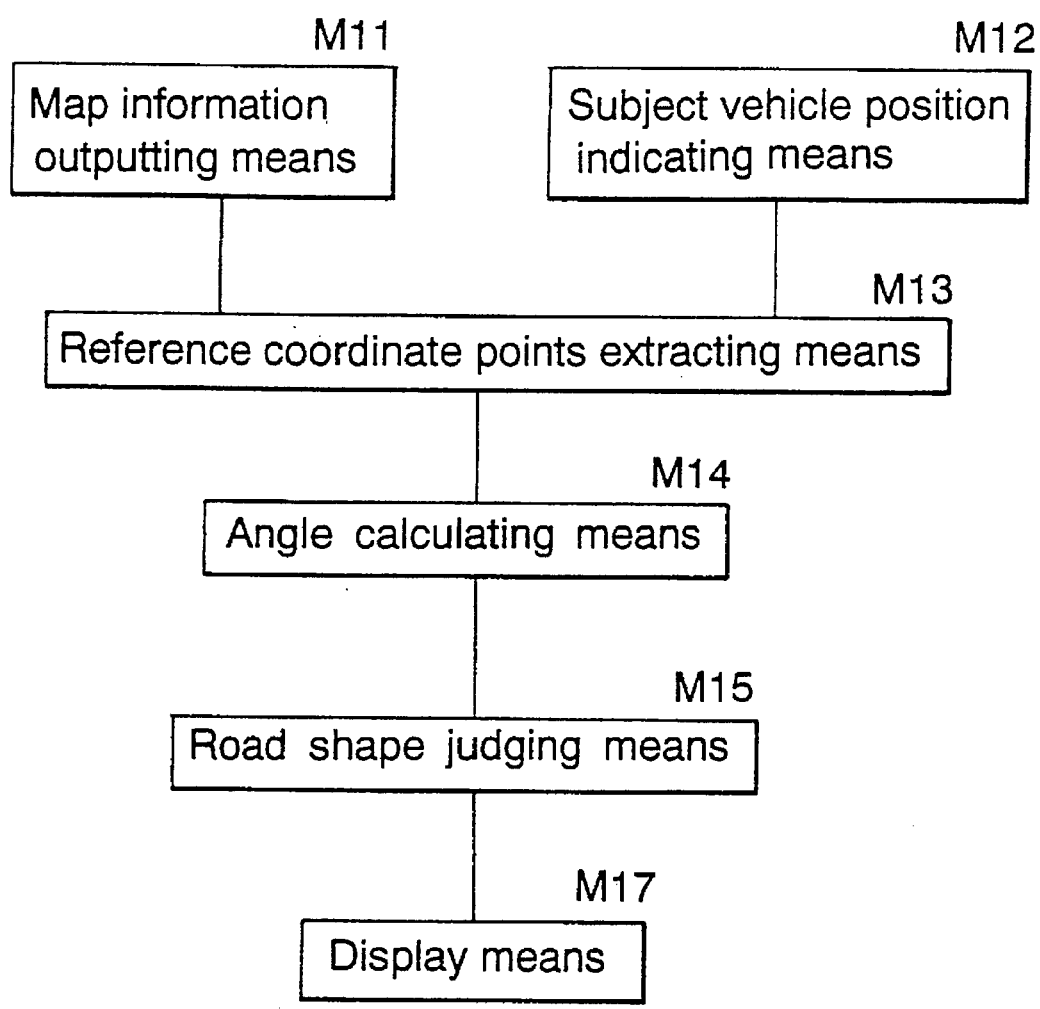

FIG. 6 is a block diagram illustrating a control system according to the third embodiment. The control system includes a map information outputting means M11 corresponding to the map information outputting means 2, a subject vehicle position indicating means M12 corresponding to the navigating device 1, a reference coordinate points extracting means M13, an angle calculating means M14 and a road shape judging means M15 which correspond to the control section 3, and a display means M17 corresponding to the display means 11 and the sound means 12.

The reference coordinate points extracting means M13 extracts four nodes $N_1$ to $N_4$ (which will be referred to as reference nodes hereinafter) for judging the shape of mad from a plurality of nodes established on a road.

Figure 8:
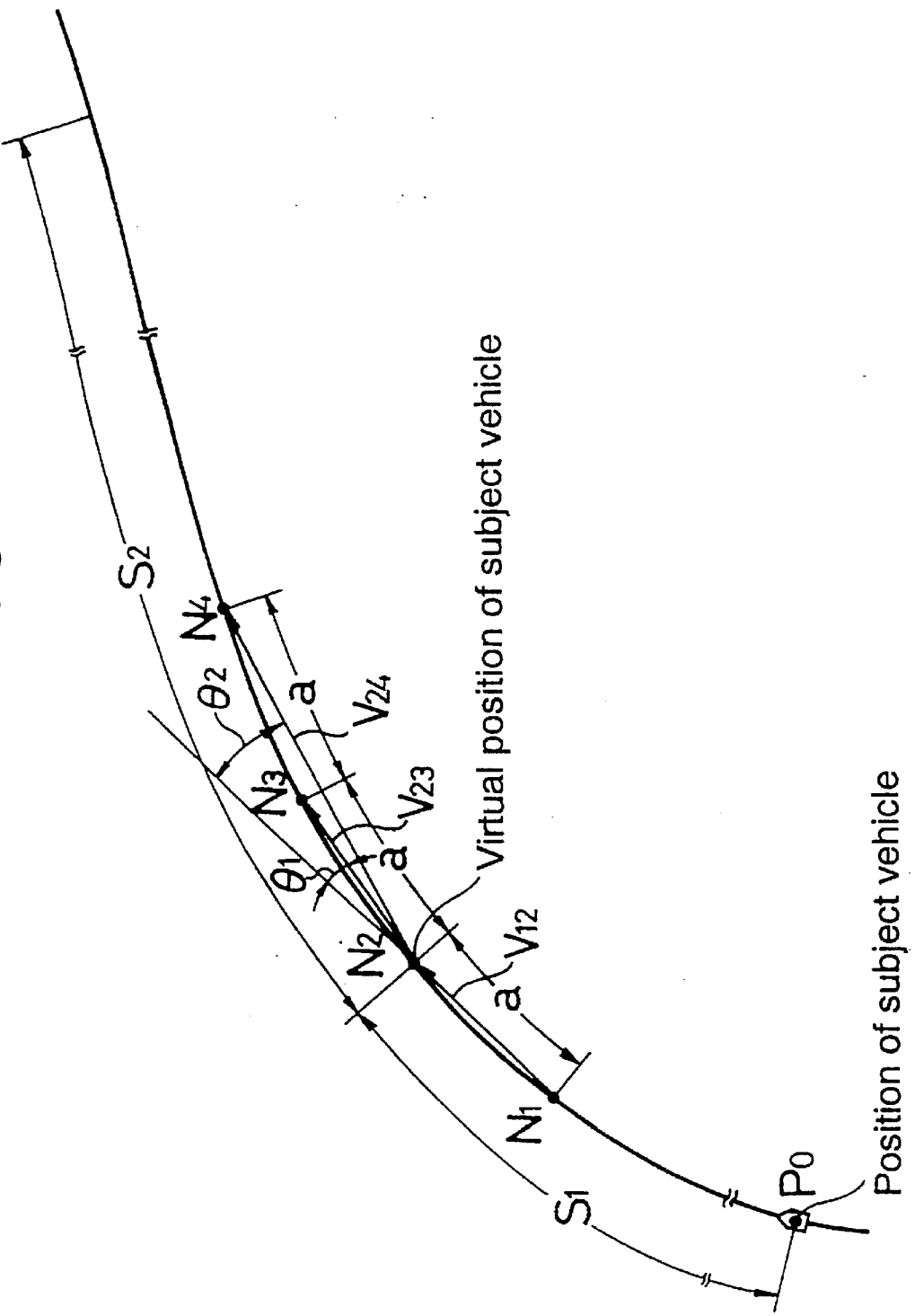

With reference to FIG. 8, the angle calculating means M14 calculates an angle $\theta_1$ formed by a vector $V_{12}$ as a vector connecting the reference nodes $N_1$ and $N_2$, and a vector $V_{23}$ as a vector connecting the reference nodes $N_2$ and $N_3$, and an angle $\theta_2$ formed by the vector $V_{12}$ as a vector connecting the reference nodes $N_1$ and $N_2$ and a vector $V_{24}$ as a vector connecting the reference nodes $N_2$ and $N_4$, and calculates a variation rate $\alpha$ for judging the shape of road from such angles $\theta_1$ and $\theta_2$. A procedure for calculating the variation rate $\alpha$ will be described in detail hereinafter.

The road shape judging means M15 judges the shape of a road by comparing the variation rate $\alpha$ with a reference value.

Figure 7:
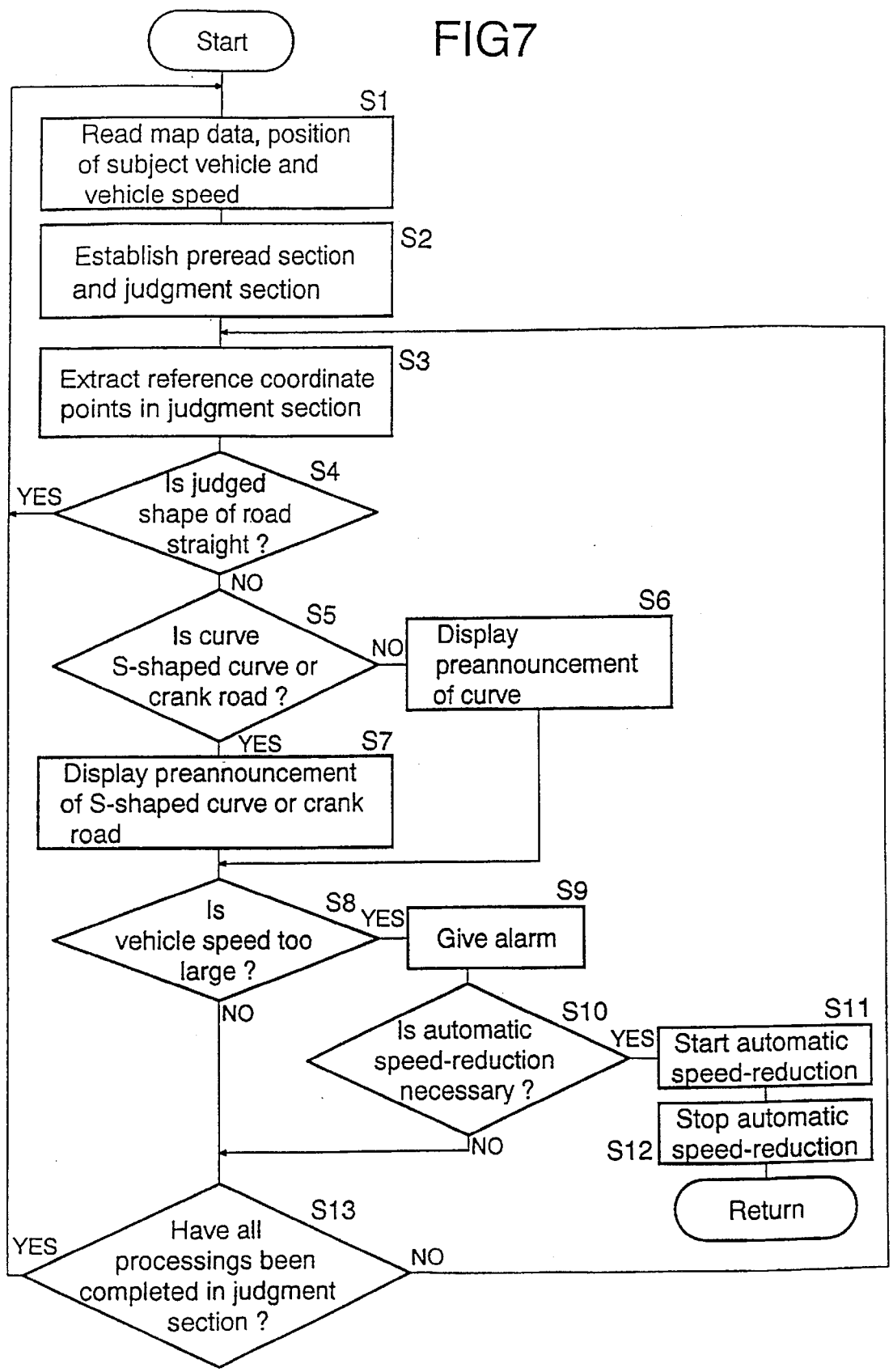

The operation of the third embodiment will be described with reference to a flow chart shown in FIG. 7.

First, a map information (i.e., coordinates N (X, Y) of nodes N) is read from the map information outputting means M11; a position $P_0$ ($X_0$, $Y_0$) of the subject vehicle is read from the subject vehicle position indicating means M12, and a vehicle speed $V_0$ is read from the vehicle speed detecting means 6 (at step S1).

Then, a preread section $S_1$ and a judgment section $S_2$ are calculated (at step S2). As shown in FIG. 8, the pretend section $S_1$ is set ahead of the position $P_0$ of the subject vehicle and determined as a product ($S_1=V_0\times t_1$) of a current vehicle speed $V_0$ and a predetermined time $t_1$, or as a distance ($S_1=V_0 t_1-(\beta t_1^2/2)$) required for stopping of the vehicle within the predetermined time $t_1$ upon braking at a predetermined deceleration $\beta$. The pretend section $S_1$ is intended to provide a time margin to the driver for braking or steering after judgment of the shape of a road ahead of the subject vehicle.

The judgment section $S_2$ is set in a predetermined range ahead of a front end of the preread section $S_1$ (which will be referred to as a virtual position of the subject vehicle), and for example, is determined as a product ($S_2=V_0\times t_2$) of the current vehicle speed $V_0$ and a predetermined time $t_2$.

Then, four nodes $N_1$, $N_2$, $N_3$ and $N_4$ (which will be referred to as reference nodes $N_1$, $N_2$, $N_3$ and $N_4$ hereinafter) for judging the shape of a road are extracted by the reference coordinate points extracting means M13 (at step S3). The second reference node $N_2$ is established at the virtual position of the subject vehicle; the first reference node $N_1$ is set at a position behind the second reference node $N_2$ by a distance a; the third reference node $N_3$ is set at a position ahead of the second reference node $N_2$ by the distance a; and the fourth reference node $N_4$ is set at a position ahead of the third reference node $N_3$ by the distance a, wherein a is a constant or a product ($a=V_0\times t_3$) of the vehicle speed $V_0$ and a predetermined time $t_3$.

If there is no node N existing at a position established by a multiple of the distance a on the basis of the virtual position of the subject vehicle, i.e., there is not a road datum at the established position, the nodes N in closest proximity to such position are extracted as reference nodes $N_1$ to $N_4$.

In this embodiment, the reference nodes $N_1$ to $N_4$ have been extracted at substantially equal distances, but if there are only a small number of nodes N established on a road (i.e., if the nodes are coarse), adjacent nodes N may be directly extracted.

Figure 9A:
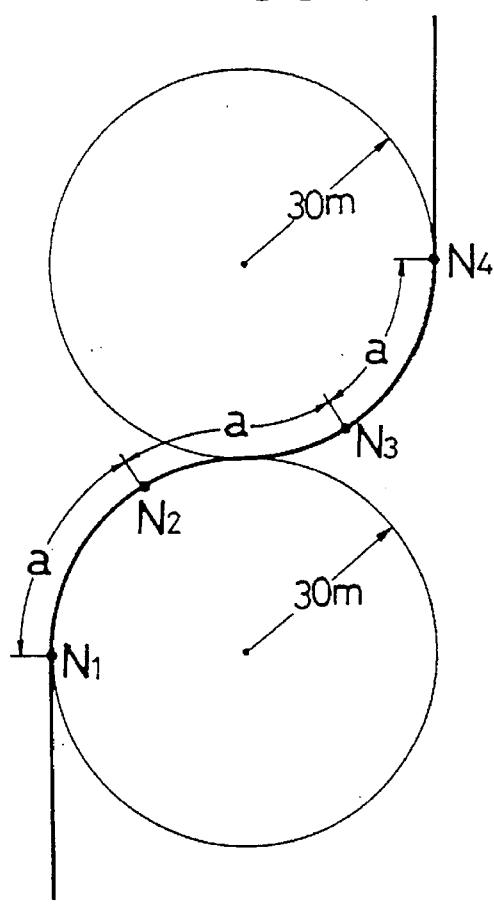
FIGS. 9A and 9B are diagrams for explaining a way of extracting reference coordinate points.

As shown in FIG. 9A, an S-shaped curve of compound curves represents a severest passing condition. But if the distance a is determined as a constant equal to 30 m, for example, a compact S-shaped curve comprised of two interconnected circular arcs having a radius R of curvature equal to 30 m can also be reliably judged according to the invention.

Figure 9B:
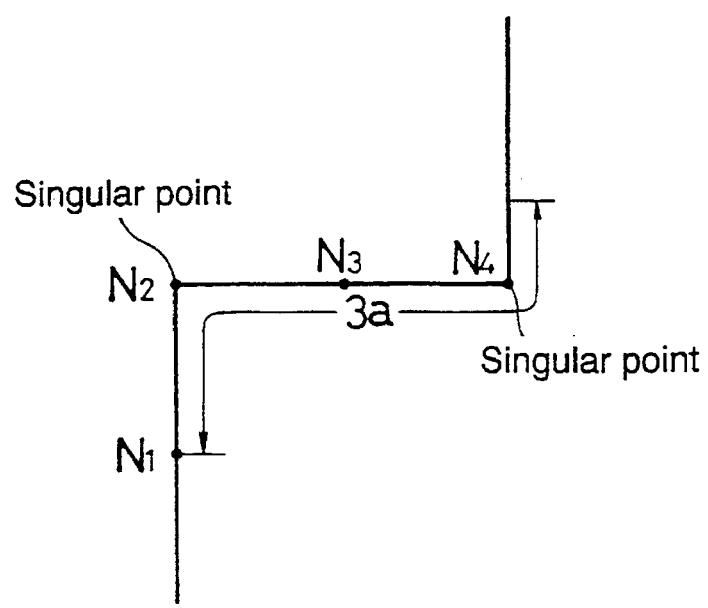

Further, if there is a bent road such as crank road existing in the judgment section $S_2$, as shown in FIG. 9B, nodes corresponding to bent points (singular points) are preferentially extracted as reference nodes $N_1$ to $N_4$. Thus, the shape of a special road such as a crank road can be reliably judged.

Then, the shape of the road is judged on the basis of coordinates of the four reference nodes $N_1$ to $N_4$ (at step S4).

First, the angles $\theta_1$ and $\theta_2$ are calculated by the angle calculating means M14. More specifically, following vectors are calculated: a vector $V_{12}$ ($X_{12}$, $Y_{12}$) connecting the first reference node $N_1$ ($X_1$, $Y_1$) and the second reference node $N_2$ ($X_2$, $Y_2$), a vector $V_{23}$ ($X_{23}$, $Y_{23}$) correcting the second reference node $N_2$ ($X_2$, $Y_2$) and the third reference node $N_3$ ($X_3$, $Y_3$), and a vector $V_{24}$ connecting the second reference node $N_2$ ($X_2$, $Y_2$) and the fourth reference node $N_4$ ($X_4$, $Y_4$) as shown in FIG. 8.

At this time, if an angle formed by the vector $V_{12}$ and the vector $V_{23}$ is represented by $\theta_1$, a following expression [1]:

$$X_{12} \times X_{23} + Y_{12} \times Y_{23} = (X_{12}^2 + Y_{12}^2)^{1/2} \times (X_{23}^2 + Y_{23}^2)^{1/2} \times \cos\theta_1 \quad [1]$$

is established from an inner product of the vector $V_{12}$ and the vector $V_{23}$, and $\cos\theta_1$ is determined from this expression [1].

In addition, if an angle formed by the vector $V_{12}$ and the vector $V_{24}$ is represented by $\theta_2$, a following expression [2]:

$$X_{12} \times X_{24} + Y_{12} \times Y_{24} = (X_{12}^2 + Y_{12}^2)^{1/2} \times (X_{24}^2 + Y_{24}^2)^{1/2} \times \cos\theta_2 \quad [2]$$

is established from an inner product of the vector $V_{12}$ and the vector $V_{24}$, and $\cos\theta_2$ is determined from such expression [2].

Then, a variation rate $\alpha$ is calculated according to a following expression [3]:

$$\alpha = (\cos\theta_1 - \cos\theta_2)/\cos\theta_1 \quad [3]$$

As apparent from the expression [3], a case where the absolute value of the variation rate is small corresponds to a case where $\theta_1$ and $\theta_2$ are substantially equal to each other, and a road is bent to a small extent (i.e., it is nearly straight). Conversely, a case where the absolute value of the variation rate is large, corresponds to a case where $\theta_1$ and $\theta_2$ are largely different from each other, and a road is bent to a large extent (i.e., it is a crank road or a sharp curve).

A direction of bending of the road can be judged by an outer product of the vector $V_{12}$ and the vector $V_{23}$, i.e., by whether the result of $X_{12} \times Y_{23} - Y_{12} \times X_{23}$ is positive or negative.

Thus, the road shape judging means M15 judges the shape of any of various roads in accordance with the value of the variation rate $\alpha$, as shown in FIGS. 10A–10E and 11.

If the shape of the road judged in the above manner is a curve (at step S4), it is judged whether or not the curve is an S-shaped curve or a crank road (at step S5). If the shape of the road is a simple curve, an advance notice of the curve is displayed on the display means M17 (at step S6). If the shape of the road is an S-shaped curve or a crank road through which it is difficult for the vehicle to pass, an advance notice of the S-shaped curve or the crank road is displayed on the display means M17 (at step S7).

Then, it is judged whether or not the current vehicle speed $V_0$ is appropriate for the judged shape of the road (at step S8). If the current vehicle speed $V_0$ is too large, as compared with a vehicle speed permitting the subject vehicle to safely pass through a curve ahead thereof, an alarm is given to the driver by the display means M17 (at step S9). Despite the alarm given to the driver, if the speed is not reduced down to an appropriate vehicle speed which permits the subject vehicle to reliably pass through the curve (at step S10), an automatic speed-reduction is carried out by the vehicle speed control means 13 (at step S11). When the subject vehicle has passed through the subject curve, or the vehicle speed $V_0$ is reduced down to such appropriate vehicle speed (at step S12), the automatic speed-reduction is stopped, returning to step S1.

If NO at steps S8 and S10 and the automatic speed-reduction is not required, it is judged whether or not the processing has been conducted for the entire area of the judgment section $S_2$ (at step S13). If NO at step S13, i.e., the processing for the entire area is not completed, the processing at step S13 is returned to step S3, at which the reference nodes $N_1$ to $N_4$ are displaced forwardly, and the above-described processing is repeated. As a result, the answer at step S13 is changed to YES, whereby all the processings are completed, returning to step S1.

As described above, the shape of the road is judged on the basis of the map information comprised of the plurality of coordinates N (X, Y) of the plurality of nodes N. Therefore, the servicing of an infrastructure requiring increased equipment and maintenance costs is needless with the present invention, and instead it is possible to judge the shape of the road with a minimum amount of data storable in the CD-ROM or IC card.

A fourth embodiment of the present invention will now be described with reference to FIGS. 12 to 19.

The fourth embodiment is intended to judge the shape of a road on the basis of three adjacent reference nodes $N_1$, $N_2$ and $N_3$, and is different from the third embodiment in that the shape of the road is judged on the basis of an output from the angle calculating means M14 and an output from a distance calculating means M16, as shown in FIG. 12. The remaining arrangement is the same as in the third embodiment.

In map information according to the fourth embodiment, the position of each of the nodes is determined so that a distance (which will be referred to as a range hereinafter) between a line connecting the adjacent nodes and a road is equal to or smaller than a reference value k according to a rule for making data. Thus, the range is suppressed to a value equal to or smaller than the reference value k by determining the distance between the adjacent nodes in a road section having a small radius of curvature at a small value, as shown in FIG. 13.

The extraction of the three reference nodes $N_1$, $N_2$ and $N_3$ is carried out in the following manner. The rearmost node $N_1$ among the three reference nodes $N_1$, $N_2$ and $N_3$ is set at a leading end of a preread section $S_1$, and is defined as the first reference node; the adjacent node N ahead of the first reference node $N_1$ is defined as the second reference node $N_2$; and the adjacent node N ahead of the second reference node $N_2$ is defined as the third reference node $N_3$. The three reference nodes $N_1$, $N_2$ and $N_3$ are extracted sequentially at forwardly displaced locations.

A procedure for judging the shape of a road on the basis of coordinates of the three reference nodes $N_1$, $N_2$ and $N_3$ will be described below.

Figure 14:
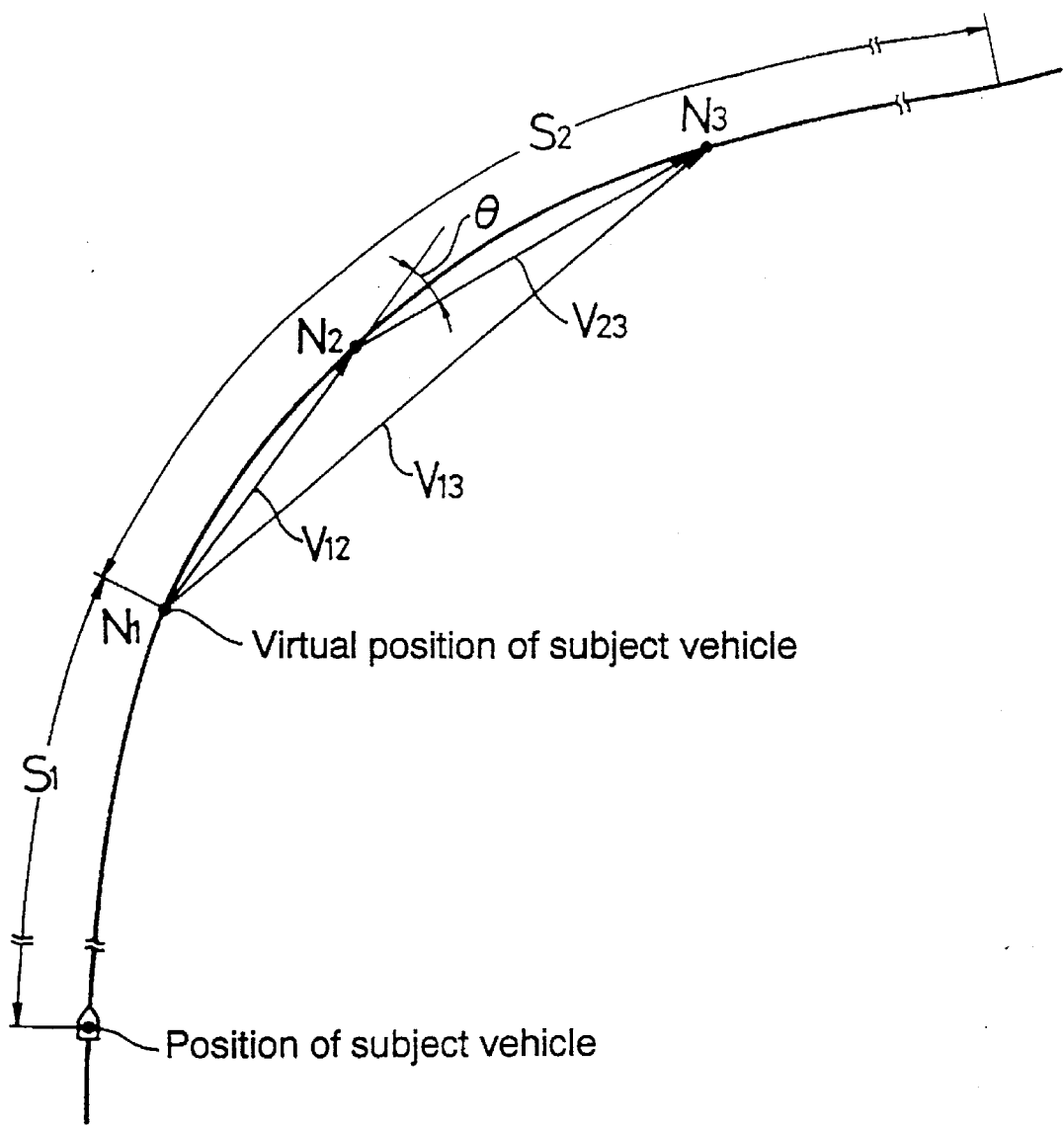

First with reference to FIG. 14, an angle $\theta$ formed by a vector $V_{12}$ ($X_{12}$, $Y_{12}$) connecting the first reference node $N_1$ ($X_1$, $Y_1$) and the second reference node $N_2$ ($X_2$, $Y_2$) and a vector $V_{23}$ ($X_{23}$, $Y_{23}$) connecting the second reference node $N_2$ ($X_2$, $Y_2$) and the third reference node $N_3$ ($X_3$, $Y_3$) is calculated by the angle calculating means M14.

More specifically, a following expression [4]:

$$X_{12} \times X_{23} + Y_{12} \times Y_{23} = (X_{12}^2 + Y_{12}^2)^{1/2} \times (X_{23}^2 + Y_{23}^2)^{1/2} \times \cos\theta \quad [4]$$

is established from an inner product of the vectors $V_{12}$ and $V_{23}$, and the angle is determined according to the expression [4].

Figure 15:
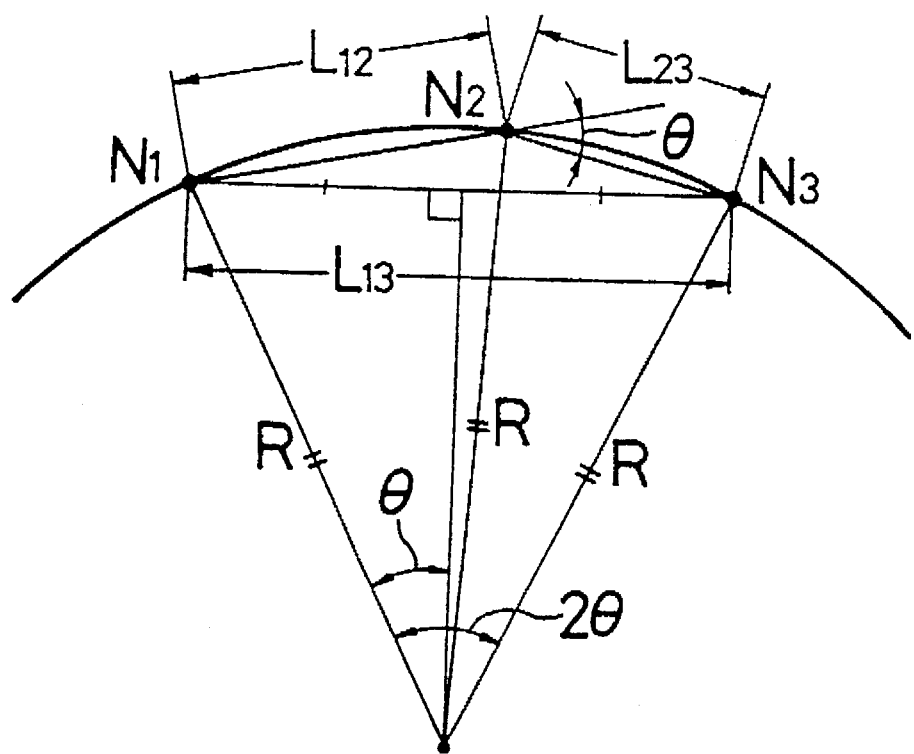

Then with reference to FIG. 15, the following distances are calculated by the distance calculating means M16: a distance $L_{12}$ between the first reference node $N_1$ ($X_1$, $Y_1$) and the second reference node $N_2$ ($X_2$, $Y_2$), a distance $L_{23}$ between the second reference node $N_2$ ($X_2$, $Y_2$) and the third reference node $N_3$ ($X_3$, $Y_3$), and a distance $L_{13}$ between the first reference node $N_1$ ($X_1$, $Y_1$) and the third reference node $N_3$ ($X_3$, $Y_3$).

$$L_{12} = (X_{12}^2 + Y_{12}^2)^{1/2} \quad [5]$$

$$L_{23} = (X_{23}^2 + Y_{23}^2)^{1/2} \quad [6]$$

$$L_{13} = (X_{13}^2 + Y_{13}^2)^{1/2} \quad [7]$$

Here, the vector connecting the first reference node $N_1$ ($X_1$, $Y_1$) and the third reference node $N_3$ ($X_3$, $Y_3$) is defined as a vector $V_{13}$ ($X_{13}$, $Y_{13}$).

As apparent from FIG. 15, provided that the three reference nodes $N_1$, $N_2$ and $N_3$ exist on a common circular arc, i.e., when the curve is arcuate, a radius R of curvature of the arcuate curve is determined, if $L_{12} \cong L_{23}$, according to a following expression [8]:

$$R = L_{13}/(2\sin\theta) \quad [8]$$

Thus, it can be judged on the basis of this radius R of curvature whether or not it is possible for the subject vehicle to pass through the curve.

When the angle $\theta$ and the distance $L_{13}$ have been determined in the above manner from the three reference nodes $N_1$, $N_2$ and $N_3$, the shape of the road can be judged on the basis of the magnitude of the angle $\theta$ and the magnitude of the distance $L_{13}$. As shown in FIG. 16, as the angle $\theta$ is larger and the distance $L_{13}$ is smaller, the radius of curvature of the curve is smaller. As the angle $\theta$ is smaller and the distance $L_{13}$ is larger, the radius of curvature of the curve is larger.

If the three reference nodes $N_1$, $N_2$ and $N_3$ exist on a common circular arc, i.e., if the curve is arcuate, the shape of the road can be judged, as shown in FIG. 16, and the inlet of a curve gradually decreased in radius of curvature and the outlet of a curve gradually increased in radius of curvature other than the arcuate curve can be judged in the following manner.

Supposing that the three reference nodes $N_1$, $N_2$ and $N_3$ exist on a common circular arc, as shown in FIG. 18, a radius R of curvature is calculated in the above-described manner, and a range between the longer one of the vectors $V_{12}$ and $V_{23}$ and the circular arc having the radius R of curvature is determined. If the determined range is not more than a reference value k such as discussed above, it is determined that the three reference nodes $N_1$, $N_2$ and $N_3$ exist on the circular arc having the radius R of curvature. If the determined range exceeds the reference value k, it is determined that the three reference nodes $N_1$, $N_2$ and $N_3$ cannot exist on such circular arc, and they exist on a non-arcuate curve gradually varied in radius of curvature at the three reference nodes $N_1$, $N_2$ and $N_3$ (i.e., on a curve inlet or outlet).

Figure 17:
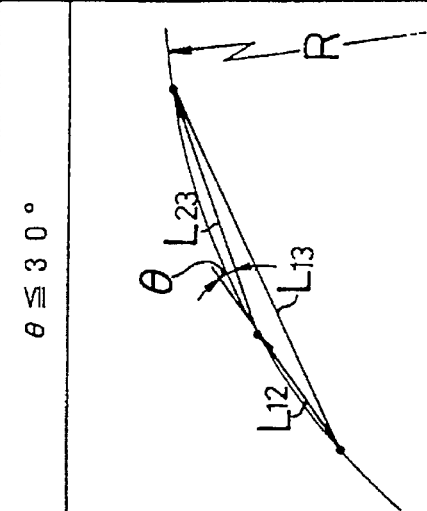

This will be further described in detail. As shown in FIG. 17, if the distance $L_{12}$ between the first and second reference nodes $N_1$ and $N_2$ is larger than the distance $L_{23}$ between the second and third reference nodes $N_2$ and $N_3$, and a range between the vector $V_{12}$ connecting the first and second reference nodes $N_1$ and $N_2$ and a circular arc extending through the three reference nodes $N_1$, $N_2$ and $N_3$ exceeds the reference value k, it is determined that the shape of the road is of the inlet of a curve gradually decreased in radius of curvature. On the other hand, if the distance $L_{23}$ is larger than the distance $L_{12}$, and a range between the vector $V_{23}$ and the circular arc exceeds the reference value k, it is determined that the shape of the road is of the outlet of a curve gradually increased in radius of curvature.

In FIG. 19, a right and lower region having a large angle $\theta$ and a small distance $L_{13}$ corresponds to a sharp curve having a small radius of curvature, an intersection, a branch road or the like, and a left and upper region having a small angle $\theta$ and a large distance $L_{13}$ corresponds to a gentle curve having a large radius of curvature or a straight road. Each of $k_1$, $k_2$, $k_3$ and $k_4$ represents a reference value of a range ($k_1 > k_2 > k_3 > k_4$). If a point determined by the calculated angle $\theta$ and distance $L_{13}$ exists, for example, in a left and lower region having the reference value $k_2$, the shape of the road is a constant arcuate curve. If such point exists in a right and upper region having the reference range $k_2$, the shape of the road is a non-arcuate curve varied in radius of curvature.

If the judged shape of the road is a non-arcuate line, a radius of curvature for judging whether or not it is possible for the vehicle to safely pass through the curve is determined in the following manner. The radius R of curvature determined as shown in FIG. 18 does not reflect an actual radius of curvature, and an actual radius of curvature in the vicinity of the curve outlet (i.e., in the vicinity of the second and third reference nodes $N_2$ and $N_3$) is smaller than such radius R of curvature. Therefore, if a position $N_1'$ at the distance $L_{23}$ from the second reference node $N_2$ is taken on a line connecting the first and second reference nodes $N_1$ and $N_2$, and a radius R' of curvature of a circular arc extending through the three points $N_1'$, $N_2$ and $N_3$ is determined, such radius R' of curvature assumes an appropriate value for judging whether or not it is possible for the vehicle to safely pass through the curve.

In the third and fourth embodiments, it is, of course, also possible to control the vehicle speed and the steering angle on the basis of the judged shape of the road by the vehicle control means M6 including the vehicle speed control means 13 and the steering angle control means 14 as in the first and second embodiments.

Although the embodiments of the present invention have been described in detail, it will be understood that the present invention is not limited to these embodiments, and various modifications may be made.

What is claimed is:

1. A vehicle control system comprising:
   a map information outputting means for outputting map information comprised of a plurality of coordinate points constituting a road;
   a subject vehicle position indicating means for indicating a position of a subject vehicle on the road;
   a reference coordinate point extracting means for extracting at least three separate reference coordinate points on the road ahead of the position of the subject vehicle;

a road shape judging means for judging a shape of the road based on the extracted reference coordinate points; and a vehicle control means for controlling the vehicle based on the judged shape of the road.

2. A vehicle control system according to claim 1, further including a vehicle speed detecting means for detecting a vehicle speed of the subject vehicle, and wherein a distance between the reference coordinate points extracted by said reference coordinate point extracting means are adjusted based on the vehicle speed detected by said vehicle speed detecting means.

3. A vehicle control system according to claim 1, wherein said vehicle control means includes a steering-angle control means for controlling at least one of a steering angle and a steering torque based on the shape of the road judged by said road shape judging means.

4. A vehicle control system according to claim 1, wherein said vehicle control means includes a vehicle speed control means comprising at least one of a brake device and an auto-cruising device for controlling the vehicle speed based on the shape of the road judged by said road shape judging means.

5. A vehicle control system according to claim 1, wherein said vehicle control means includes at least one of a display means and a sound means for giving an alarm to a driver based on the shape of the road judged by said road shape judging means.

6. A vehicle control system according to claim 1, further including means for setting a virtual position of the subject vehicle on a road ahead of the position of the subject vehicle by a predetermined distance, and said reference coordinate points are extracted based on said virtual position of the subject vehicle.

7. A vehicle control system according to claim 6, wherein said virtual position of the subject vehicle is set and said reference coordinate points are extracted based on a preread distance relating to vehicle speed.

8. A vehicle control system according to claim 6, wherein the reference coordinate points are disposed forwardly of the virtual position of the vehicle.

9. A vehicle control system according to claim 1, wherein distances between adjacent ones of said reference coordinate points are substantially equal.

10. A vehicle control system according to claim 1, further including vehicle speed detecting means for detecting a speed of a subject vehicle, said reference coordinate point extracting means extracts said reference coordinate points based on a detected vehicle speed, and said reference coordinate points extracting means adjusts said reference coordinate points to correlate with the map information output by said map information outputting means.

11. A vehicle control system comprising:

a map information outputting means for outputting map information comprised of a plurality of coordinate points constituting a road;

a subject vehicle position indicating means for indicating a position of a subject vehicle on the road;

a reference coordinate point extracting means for extracting at least four separate reference coordinate points on the road ahead of the position of the subject vehicle;

an angle calculating means for calculating an angle formed by lines connecting the reference coordinate points;

a road shape judging means for judging the shape of the road based on an arrangement of the reference coordinate points determined based on the calculated angle; and a vehicle control means for controlling the vehicle based on the judged shape of the road.

12. A vehicle control system according to claim 11, wherein said vehicle control means includes a steering-angle control means for controlling at least one of a steering angle and a steering torque based on the shape of the road judged by said road shape judging means.

13. A vehicle control system according to claim 11, wherein said vehicle control means includes a vehicle speed control means comprising at least one of a brake device and an auto-cruising device for controlling the vehicle speed based on the shape of the road judged by said road shape judging means.

14. A vehicle control system according to claim 11, wherein said vehicle control means includes at least one of a display means and a sound means for giving an alarm to a driver based on the shape of the road judged by said road shape judging means.

15. A vehicle control system according to claim 11, further including means for setting a virtual position of the subject vehicle on a road ahead of the position of the subject vehicle by a predetermined distance, and said reference coordinate points are extracted based on said virtual position of the subject vehicle.

16. A vehicle control system comprising:

a map information outputting means for outputting map information comprised of a plurality of coordinate points constituting a road;

a subject vehicle position indicating means for indicating a position of a subject vehicle on the road;

a reference coordinate point extracting means for extracting at least three separate, adjacent reference coordinate points on a road ahead of the position of the subject vehicle;

an angle calculating means for calculating an angle formed by lines connecting the reference coordinate points;

a distance calculating means for calculating distances between the reference coordinate points;

a road shape judging means for judging a shape of the road based on an arrangement of the reference coordinate points determined based on said calculated angle and said calculated distances; and a vehicle control means for controlling the vehicle based on the judged shape of the road.

17. A vehicle control system according to claim 16, wherein said vehicle control means includes a steering-angle control means for controlling at least one of a steering angle and a steering torque based on the shape of the road judged by said road shape judging means.

18. A vehicle control system according to claim 16, wherein said vehicle control means includes a vehicle speed control means comprising at least one of a brake device and an auto-cruising device and controls the vehicle speed based on the shape of the road judged by said road shape judging means.

19. A vehicle control system according to claim 16, wherein said vehicle control means includes at least one of a display means and a sound means for giving an alarm to a driver based on the shape of the road judged by said road shape judging means.

20. A vehicle control system according to claim 16, further including means for setting a virtual position of the subject vehicle on a road ahead of the position of the subject vehicle by a predetermined distance, and said reference coordinate points are extracted based on said virtual position of the subject vehicle.

* * * * *

UNITED STATES PATENT AND TRADEMARK OFFICE
CERTIFICATE OF CORRECTION

PATENT NO. : 5,661,650                          Page 1 of 2
DATED : August 26, 1997
INVENTOR(S) : Hiroshi Sekine, Kazuya Tamura It is certified that error appears in the above-indentified patent and that said Letters Patent is hereby corrected as shown below:

Column 2, line closest aligned with number "60", delete "FIG. 12 is a block diagram of a control system;";
    between lines 62 and 63, insert the line (new paragraph) --FIG. 12 is a block diagram of a control system;--.

Column 3, 4th line, change "nonarcuate" to --non-arcuate--.

Column 4, line numbered between 35 and 36, change "ad" to --third--;
    line 55, change "are" to --arc--.

Column 5, approximately line 16 (equation (2)), change "$(X_{23}^2 + Y_{23}^2)^{1/2}X$" to --$(X_{23}^2 + Y_{23}^2)^{1/2}X$--;
    approximately line 28 (equation (4)), change "$R = 2a/(\theta_1 + \theta 2)$" to --$R = 2a/(\theta_1 + \theta_2)$--;
    line 56, change "mount" to --amount--.

Column 6, line 54, change "mount" to --amount--;
    line 62, after "set" insert --course.--.

Column 8, line 6, change "mad" to --road--;
    line 30, change "pretend" to --preread--;
    line 36, change "pretend" to --preread--.

Column 11, line 52, change "are" to --arc--;
    line 59, change "are" to --arc--;
    line 66, change "are" to --arc--.

UNITED STATES PATENT AND TRADEMARK OFFICE
CERTIFICATE OF CORRECTION

PATENT NO. : 5,661,650
DATED : August 26, 1997
INVENTOR(S) : Hiroshi Sekine, Kazuya Tamura It is certified that error appears in the above-indentified patent and that said Letters Patent is hereby corrected as shown below:

Column 12, 10th line, change "are" to --arc--;
16th line, change "are" to --arc--.

Signed and Sealed this

Twenty-eighth Day of October, 1997

Attest:

BRUCE LEHMAN

Attesting Officer      Commissioner of Patents and Trademarks